United States Patent
Sharma et al.

(10) Patent No.: US 11,556,952 B2
(45) Date of Patent: Jan. 17, 2023

(54) DETERMINING TRANSACTION-RELATED USER INTENTIONS USING ARTIFICIAL INTELLIGENCE TECHNIQUES

(71) Applicant: Dell Products L.P., Round Rock, TX (US)

(72) Inventors: Ripunjay Sharma, Uttar Pradesh (IN); Partha Sarathi Nayak, Odisha (IN)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 16/874,815

(22) Filed: May 15, 2020

(65) Prior Publication Data

US 2021/0357965 A1 Nov. 18, 2021

(51) Int. Cl.
G06Q 30/02 (2012.01)
G06N 5/04 (2006.01)
G06Q 30/06 (2012.01)
G06N 20/00 (2019.01)

(52) U.S. Cl.
CPC ........... *G06Q 30/0222* (2013.01); *G06N 5/04* (2013.01); *G06N 20/00* (2019.01); *G06Q 30/0239* (2013.01); *G06Q 30/0631* (2013.01)

(58) Field of Classification Search
None
See application file for complete search history.

(56) References Cited

U.S. PATENT DOCUMENTS

| 8,412,567 | B2 | 4/2013 | Evevsky |
| 10,621,599 | B1 | 4/2020 | Jass et al. |
| 2014/0222503 | A1* | 8/2014 | Vijayaraghavan ........... G06Q 30/0201 705/7.29 |
| 2014/0279050 | A1* | 9/2014 | Makar ................. G06F 16/9535 705/14.66 |
| 2015/0154519 | A1* | 6/2015 | Doolan ................ G06Q 10/063 705/7.11 |
| 2016/0239867 | A1* | 8/2016 | Sinha ................. G06Q 30/0255 |

(Continued)

OTHER PUBLICATIONS

Erdil, "Factors Affecting Shopping Cart Abandonment: Pre-Decisional Conflict as a Mediator," Journal of Management, Marketing and Logistics (JMML), V.5(2), p. 140-152 (Year: 2018).*

*Primary Examiner* — Christopher B Tokarczyk
(74) *Attorney, Agent, or Firm* — Ryan, Mason & Lewis, LLP

(57) ABSTRACT

Methods, apparatus, and processor-readable storage media for determining transaction-related user intentions using artificial intelligence techniques are provided herein. An example computer-implemented method includes obtaining data pertaining to digital behavior of a user during a transaction-related session on one or more electronic commerce websites; classifying the user into one of multiple categories by processing the obtained data pertaining to the digital behavior of the user using artificial intelligence techniques, wherein the multiple categories correspond to multiple predicted levels of user intention to complete a transaction; determining, based on the classification of the user and the obtained data pertaining to the digital behavior of the user, at least one reason why the user may not complete a transaction during the transaction-related session; and performing one or more automated actions based at least in part on the at least one determined reason.

20 Claims, 13 Drawing Sheets

(56) References Cited

U.S. PATENT DOCUMENTS

2016/0284010 A1   9/2016  Zimmerman et al.
2018/0158129 A1   6/2018  Kohli
2019/0199741 A1*  6/2019  Myara ................. H04L 63/1425
2019/0205912 A1   7/2019  Ericson

* cited by examiner

```
let laptop = this.content.getProductCache()[0][0].ProductCode.toUpperCase();
if (this.timeSpent > 19) {
  let discount = 0;
  if (value['trackInfoResponse'].prediction[0] === "0") {
    discount = 0;
  } else if (value['trackInfoResponse'].prediction[0] === "1" && this.timeSpent > 130) {
    discount = 10;
  } else if (value['trackInfoResponse'].prediction[0] === "2" && this.timeSpent > 130) {
    discount = 5;
  }
}
let laptopCode:any = value['trackInfoResponse'].offers[0];
let x,y;
switch (laptopCode) {
  case "1": laptop = this.content.getProductCache()[0][0].ProductCode.toUpperCase();
    x = 0;
    y = 0;
    break;
  case '2': laptop = this.content.getProductCache()[4][0].ProductCode.toUpperCase();
    x = 4;
    y = 0;
    break;
  case '3': laptop = this.content.getProductCache()[1][0].ProductCode.toUpperCase();
    x = 1;
    y = 0;
    break;
  case '4': laptop = this.content.getProductCache()[6][0].ProductCode.toUpperCase();
    x = 6;
    y = 0;
    break;
  case '5': laptop = this.content.getProductCache()[0][0].ProductCode.toUpperCase();
    x = 0;
    y = 0;
    break;
  case '6': laptop = this.content.getProductCache()[3][0].ProductCode.toUpperCase();
    x = 0;
    y = 0;
    break;
}
```

```
setHover(attr: component) {
  switch (attr) {
    case component.Price:
      this.priceTracker = setInterval(() => {
        this.price += 1;
      }, 500);
      break;
    case component.ShipTime:
      this.shipTracker = setInterval(() => {
        this.shipTime += 1;
      }, 500);
      break;
    case component.Spec:
      this.specTraker = setInterval(() => {
        this.spec += 1;
      }, 500);
      break;
    case component.Type:
      this.typeTracker = setInterval(() => {
        this.type += 1;
      }, 500);
      break;
  }
  this.hover_click += 1;
}
```

```
removeHover(attr: component) {
  switch (attr) {
    case component.Price:
      clearInterval(this.priceTracker);
      break;
    case component.ShipTime:
      clearInterval(this.shipTracker);
      break;
    case component.Spec:
      clearInterval(this.specTraker);
      break;
    case component.Type:
      clearInterval(this.typeTracker);
      break;
  }
} updateHover_Click() {
  this.hover_click += 1;
} getBotEvent() {
  return this.botMessageEvent;
}
```

FIG. 5

```
helpMessage(message) {
    switch (message) {
        case 'Urgent Requirement':
            this.shipTime += 10;
            this.botMessageEvent.emit({
                message: `We have a configurations of LaptopA, LaptopB, LaptopC and LaptopD which we can deliver in 5 days.
                We will let you know if we find something more interesting for you.`,
                options: [],
            });
            break;
        case 'High Configuration':
            this.spec += 10;
            this.botMessageEvent.emit({
                message: `Have a look at LaptopD, you might find it interesting.
                We will let you know if we find something more interesting for you.`,
                options: [],
            });
            break;
        case 'Fixed budget':
            this.price += 10;
            this.botMessageEvent.emit({
                message: `Have look at LaptopA, LaptopB and LaptopC, you might find them interesting.
                We will let you know if we find something more interesting for you.`,
                options: [],
            });
            break;
    }
}
```

```
# start training
def train():
    # scaler and classifier used as global variables
    global scaler, classifier split training data into train and test sets (ratio - 75:25)
    split_obj = StratifiedShuffleSplit(n_splits = 5, test_size = 0.25, random_state = 0)
    for train_index, test_index in split_obj.split(X, Y):
        X_train, X_test = X[train_index], X[test_index]
        Y_train, Y_test = Y[train_index], Y[test_index]

# feature Scaling
    X_train = scaler.fit_transform(X_train)
    X_test = scaler.transform(X_test)

# initialize classifier
    classifier = LogisticRegression(random_state = 0, solver = 'newton-cg', multi_class = 'multinomial', verbose = 1)

# fit the model
    classifier.fit(X_train, Y_train)

# accuracy score on training set
    score_train = classifier.score(X_train, Y_train)

# accuracy score on test set
    score_test = classifier.score(X_test, Y_test)

return classifier
```

FIG. 7

```
# identify reason(s) for cart abandonment
def identify_reason():
    # empty lists for offers & labels
    offers = []
    labels = []

# mapping offers to labels
    mapping = {'Price': '1', 'Shipment_Time': '3', 'Specs': '2'} threshold for euclidean distance
    threshold = 0.1 create subset of test data
    test_data_subset = test_data[['Price', 'Shipment_Time', 'Specs']]

# divide subset of test data by Hover_Clicks
    test_data_subset = test_data_subset.divide(test_data['Hover_Clicks'].values[0])

# sort subset of test data
    test_data_sorted = test_data_subset.sort_values(by = 0, ascending = False, axis = 1)

# append largest value in sorted subset of test data in offers
    offers.append(test_data_sorted.columns[0])

# further append values in sorted subset of test data according to a threshold
    if (distance.euclidean(test_data_sorted.iloc[0][0], test_data_sorted.iloc[0][1]) < threshold):
        offers.append(test_data_sorted.columns[1])

# map label for each offer
    for offer in offers:
        labels.append(mapping[offer])

return labels
```

FIG. 8

```
# define predict function as an endpoint
@app.route('/predict', methods = ['GET', 'POST'])
# serve predictions
def predict():
    # test_data used as global variable
    global test_data data to be served on api call
    data = {'prediction': [], 'offers': [], 'success': False} get request parameters
    params = flask.request.json
    if (params == None):
        params = flask.request.args return classification results if parameters are found
    if (params != None):
        # initialize test data (json) from params
        test_json = json.loads(params.get('q'))

# convert json to dataframe
        test_data = pd.DataFrame(test_json)

# feature scaling
        X_pred = scaler.transform(test_data)

# predict class for test data
        prediction = str(model.predict(X_pred)[0])

# identify reason(s) for cart abandonment
        labels = identify_reason()

data['prediction'].append(prediction)
        data['offers'].extend(labels)
        data['success'] = True return response in json format
    return flask.jsonify(data)
```

DETERMINING TRANSACTION-RELATED USER INTENTIONS USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for providing data analysis using such systems.

BACKGROUND

When a user (e.g., a customer) of an electronic commerce (e-commerce) web site selects a product for purchase (e.g., adds a product to a virtual shopping cart) and does not subsequently complete the transaction (e.g., does not checkout), the reason is typically unknown to the proprietor of the e-commerce website. Conventional transaction management techniques exist that attempt to make determinations about these types of uncompleted transactions. Such conventional techniques include sending email reminders to users of uncompleted transactions, but email reminders are often ineffective because they are typically not sent to the users until after the users have left the website(s) in question. Other conventional techniques include providing additional product recommendations to the users of uncompleted transactions, but providing additional recommendations often does not correspond to the reason(s) for the users abandoning the transactions, and conventional techniques typically do not provide such recommendations until after the conclusion of the users' transaction-related sessions on the website(s). Additionally, other conventional techniques include carrying out surveys, wherein users are queried for reasons for their abandonment of one or more transactions. However, such surveys are often ineffective due to low participation rates.

SUMMARY

Illustrative embodiments of the disclosure provide techniques for determining transaction-related user intentions using artificial intelligence techniques. An exemplary computer-implemented method includes obtaining data pertaining to digital behavior of a user during a transaction-related session on one or more electronic commerce websites, and classifying the user into one of multiple categories by processing at least a portion of the obtained data pertaining to the digital behavior of the user using one or more artificial intelligence techniques, wherein the multiple categories correspond to multiple predicted levels of user intention to complete a transaction. The method also includes determining, based at least in part on the classification of the user and the obtained data pertaining to the digital behavior of the user, at least one reason why the user may not complete a transaction during the transaction-related session on the one or more electronic commerce websites. Further, the method additionally include performing one or more automated actions based at least in part on the at least one determined reason.

Illustrative embodiments can provide significant advantages relative to conventional transaction management techniques. For example, problems associated with ineffective data collection and implementation are overcome in one or more embodiments through generating and outputting customized recommendations and/or offers for a given user during the given user's transaction session using artificial intelligence techniques in conjunction with user digital behavior associated with an incomplete transaction.

These and other illustrative embodiments described herein include, without limitation, methods, apparatus, systems, and computer program products comprising processor-readable storage media.

BRIEF DESCRIPTION OF THE DRAWINGS

FIG. 4 shows an example code snippet for processing user digital behavior in an illustrative embodiment.

FIG. 5 shows an example code snippet for processing user digital behavior in an illustrative embodiment.

FIG. 6 shows an example code snippet for implementing at least a portion of an automated conversation exchange processing program function in an illustrative embodiment.

FIG. 7 shows an example code snippet for training an artificial intelligence classification model in an illustrative embodiment.

FIG. 8 shows an example code snippet for identifying one or more reasons for cart abandonment in an illustrative embodiment.

FIG. 9 shows an example code snippet for implementing a trained artificial intelligence classification model in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
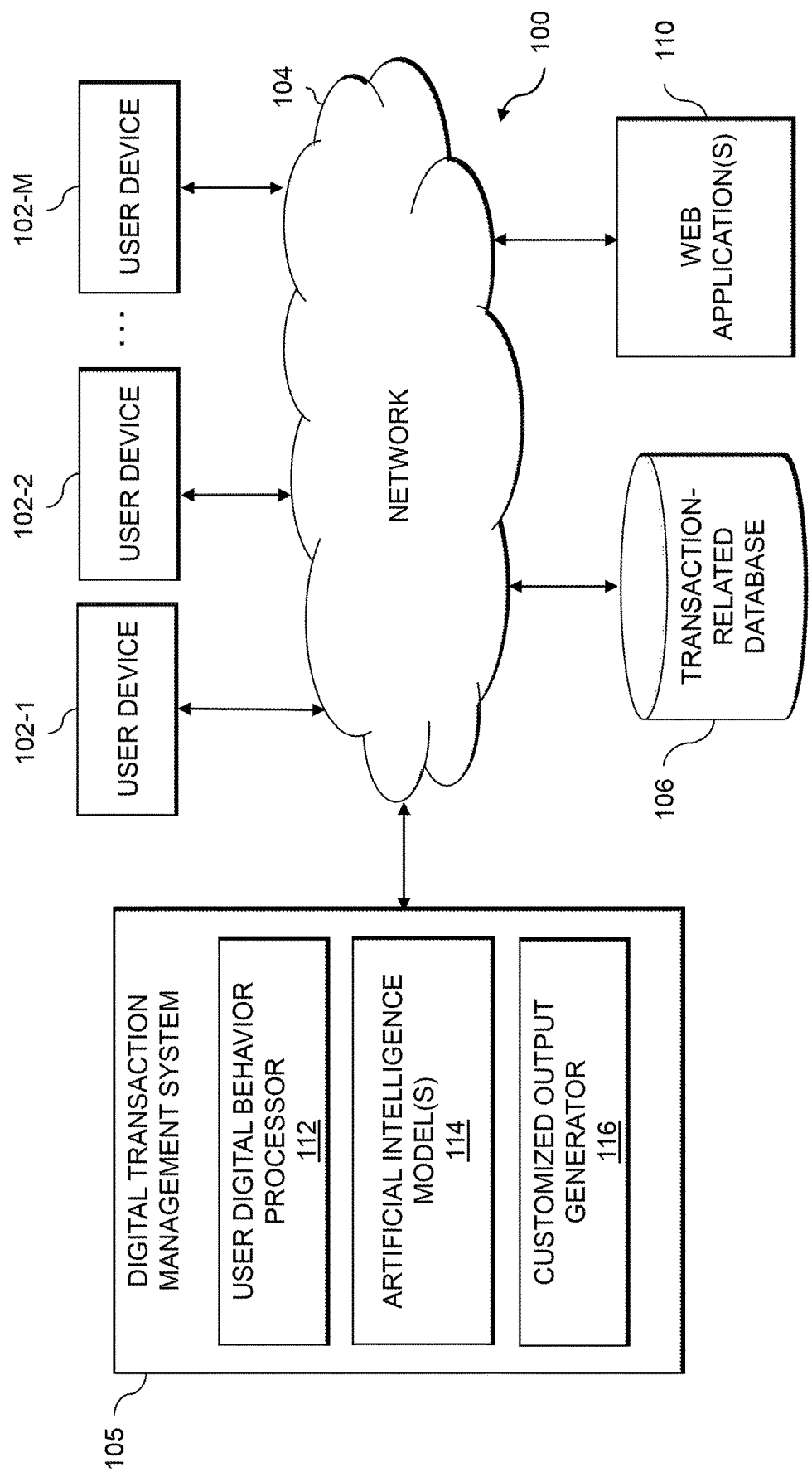
FIG. 1 shows an information processing system configured for determining transaction-related user intentions using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is digital transaction management system 105 and web application(s) 110 (e.g., one or more e-commerce applications).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the digital transaction management system 105 can have an associated database 106 configured to store data pertaining to transactions and user digital behavior associated therewith, which comprise, for example, information pertaining to completed transactions and incomplete transactions, user pointer (e.g., mouse) hover activity, user click activity, user transaction-related feedback, etc.

The database 106 in the present embodiment is implemented using one or more storage systems associated with the digital transaction management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the digital transaction management system 105 are one or more input-output devices, which illustratively comprise keyboards, displays or other types of input-output devices in any combination. Such input-output devices can be used, for example, to support one or more user interfaces to the digital transaction management system 105, as well as to support communication between the digital transaction management system 105 and other related systems and devices not explicitly shown.

Additionally, the digital transaction management system 105 in the FIG. 1 embodiment is assumed to be implemented using at least one processing device. Each such processing device generally comprises at least one processor and an associated memory, and implements one or more functional modules for controlling certain features of the digital transaction management system 105.

More particularly, the digital transaction management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the digital transaction management system 105 to communicate over the network 104 with the user devices 102, and illustratively comprises one or more conventional transceivers.

The digital transaction management system 105 further comprises a user digital behavior processor 112, artificial intelligence model(s) 114, and a customized output generator 116.

It is to be appreciated that this particular arrangement of modules 112, 114, and 116 illustrated in the digital transaction management system 105 of the FIG. 1 embodiment is presented by way of example only, and alternative arrangements can be used in other embodiments. For example, the functionality associated with the modules 112, 114, and 116 in other embodiments can be combined into a single module, or separated across a larger number of modules. As another example, multiple distinct processors can be used to implement different ones of the modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for determining transaction-related user intentions using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114, and 116 of an example digital transaction management system 105 in computer network 100 will be described in more detail with reference to the flow diagram of FIG. 10.

Accordingly, at least one embodiment includes determining transaction-related user intentions using artificial intelligence techniques. Such an embodiment includes monitoring and/or tracking a user's online digital behavior using activity such as, for example, pointer hovers and clicks, on one or more sections of an e-commerce site (e.g., sections pertaining to product specifications, price(s), shipping time(s), product type(s), etc.). In at least one example embodiment, total session time is also recorded as part of the user's digital behavioral data. Additionally or alternatively, monitored and/or tracked user data may include user activity (e.g., pointer and/or mouse hover activity and click activity) on one or more other sections of an e-commerce site as well (e.g., ratings and reviews, shipping options, payment options, etc.), depending on the features offered by the e-commerce site(s).

In one or more embodiments, the data are then leveraged to develop at least one supervised machine learning model which classifies the user based on the user's degree of checkout intention (i.e., the likelihood that the user completes a given transaction on the e-commerce site) into one of multiple categories. Such categories can include, for example, users with low checkout intention, users with moderate checkout intention, and users with high checkout intention. For building such a classification model, at least one embodiment includes using a logistic regression algorithm. It is to be appreciated, however, that one or more embodiments can additionally or alternatively include using any appropriate supervised classification algorithm depending at least in part on the dimensionality and quality of the features used as well as on the size of the training data.

By way of example, in accordance with one or more embodiments, following the classification task, for customers categorized with low or moderate checkout intention, one or more reasons for cart abandonment (that is, for the user to not complete the given transaction on the e-commerce site) are determined and/or identified by ranking the user's digital behavior (e.g., pointer hovers and clicks) from different sections of the e-commerce site. Because a user categorized with low or moderate checkout intention might have an issue with one or more of various aspects of the transaction (e.g., the product specifications, the price, the shipping time offered for a product, etc.), one or more dominant reasons for abandoning the cart can be identified, for instance, by ranking the user's pointer hover activity and click activity on one or more of the sections of the e-commerce site corresponding to such aspects of the transaction.

Also, in one or more embodiments, for a user categorized with high checkout intention, reasons for cart abandonment are not determined and/or identified because such users are likely to complete the transaction on the e-commerce site.

Once one or more reasons for cart abandonment have been determined and/or identified for the users categorized with low or moderate checkout intention, one or more automated actions are carried out based at least in part on the determined cart abandonment reason(s). For example, such actions can include generating and providing to the user one or more product recommendations and/or generating and providing to the user one or more customized deals or offers. In at least one embodiment, such product recommendations, deals and/or offers can be provided to the user, in real-time, using a chatbot (an example of an automated conversation exchange processing program), which can be integrated with the e-commerce site.

Figure 2:
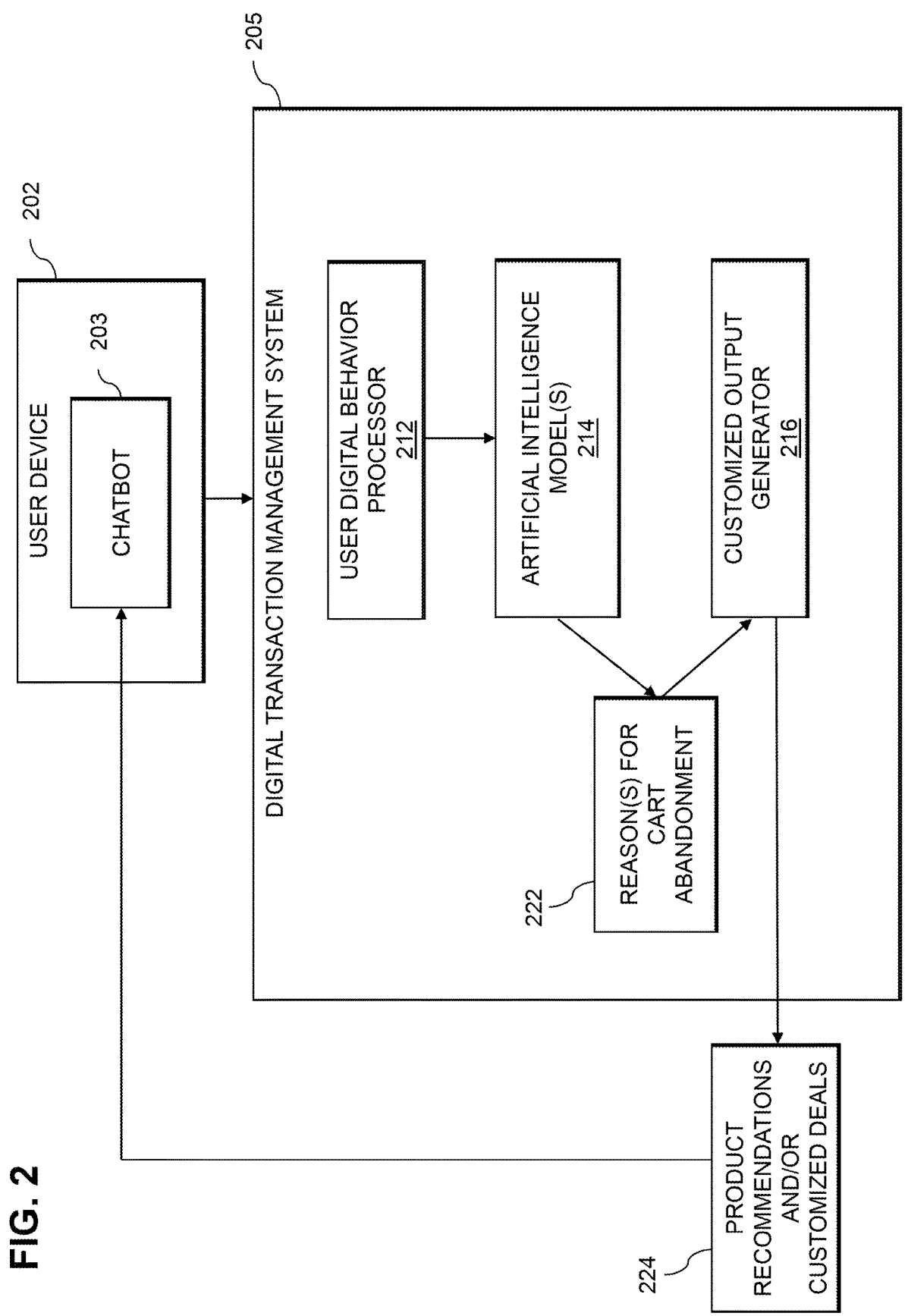
FIG. 2 shows an example workflow in accordance with an illustrative embodiment.

FIG. 2 shows an example workflow in accordance with an illustrative embodiment. By way of illustration, FIG. 2 depicts user device 202, which includes a chatbot 203. FIG. 2 also depicts digital transaction management system 205, which includes user digital behavior processor 212, artificial intelligence model(s) 214, and customized output generator 216. As illustrated in FIG. 2, the digital transaction management system 205 tracks (e.g., using the user digital behavior processor 212) the user's online digital behavior (e.g., on the e-commerce site in question) using the user's pointer hover activity and click activity. Additionally, the artificial intelligence model(s) 214 uses the processed user digital behavior to classify the user, for example, as having low checkout intention, medium checkout intention, or high checkout intention with respect to an ongoing and/or prospective transaction on the e-commerce site in question.

In instances wherein the classification generated by the artificial intelligence model(s) 214 represents, for example, low checkout intention or medium checkout intention on behalf of the user, one or more reasons 222 for potential cart abandonment by the user are determined and/or identified and provided to the customized output generator 216. Based at least in part on the determined and/or identified reason(s) 222, one or more product recommendations and/or one or more customized deals 224 (i.e., customized for the user) are determined by the customized output generator 216 and output to the user device 202 (e.g., in real-time or approximately real-time), wherein such outputs are relayed to the user of the user device 202 via the chatbot 203 of the user device (which can be integrated with the e-commerce website in question).

As detailed herein, one or more embodiments include generating and providing to the user product recommendations and/or customized deals to users identified as having low or moderate checkout intention for a given transaction on an e-commerce site, wherein such product recommendations and/or customized deals are generated based at least in part on the user's purchase history and one or more of the reasons identified for cart abandonment. By way merely of example, a price-sensitive user can be offered deals for products which are on limited offer discounts. Additionally or alternatively, if shipping time is identified as a primary reason for cart abandonment for a given user, the user can be offered flexible shipping dates as per viability. Also, because there can be multiple reasons identified for cart abandonment, product recommendations and/or deals can be customized based at least in part on the multiple reasons identified and one or more user preferences determined from the user's purchase history.

Accordingly, in one or more embodiments, utilizing artificial intelligence techniques in connection with e-commerce site data and user digital behavior data can facilitate reducing cart abandonment, increasing time spent on the e-commerce site by users, and/or increasing transaction conversion rates. Using an in-built chatbot, such embodiments include generating and offering customized deals and/or product recommendations to users in real-time, thus leveraging the time-sensitive nature of transaction experiences associated with an e-commerce site session. In such an embodiment, the chatbot is in-built to the e-commerce site, and the chatbot can output the customized deals and/or recommendations to the user, for example, visually as a text and/or image pop-up on the e-commerce site screen and/or interface. Additionally, such embodiments include reducing the reliance, time and resources spent on retargeting users that abandon the cart for a given transaction, and facilitating increased revenue of the e-commerce site in question.

Figure 3:
FIG. 3 shows an example code snippet for generating a customized output in an illustrative embodiment.

FIG. 3 shows an example code snippet for generating a customized output in an illustrative embodiment. In this embodiment, example code snippet 300 is executed by or under the control of at least one processing system and/or device. For example, the example code snippet 300 may be viewed as comprising a portion of a software implementation of at least part of the digital transaction management system 105 of the FIG. 1 embodiment.

The example code snippet 300 illustrates the generation of product recommendations and/or customized deals based on the prediction from the artificial intelligence model and the reason(s) identified for cart abandonment. For example, code snippet 300 includes analyzing six cases corresponding to different laptop products in connection with values and discounts. The generated product recommendations and/or customized deals are sent to the chatbot for displaying on the e-commerce site screen and/or interface (e.g., via a generated message such as seen in code snippet 300, recommending a particular laptop).

It is to be appreciated that this particular example code snippet shows just one example implementation of generating a customized output, and alternative implementations of the process can be used in other embodiments.

FIG. 4 shows an example code snippet for processing user digital behavior in an illustrative embodiment. In this embodiment, example code snippet 400 is executed by or under the control of at least one processing system and/or device. For example, the example code snippet 400 may be viewed as comprising a portion of a software implementation of at least part of the digital transaction management system 105 of the FIG. 1 embodiment.

The example code snippet 400 illustrates the setting of the tracking of a user's online digital behavior, using pointer hovers and clicks, on one or more sections of an e-commerce site (e.g., sections pertaining to product specifications, price(s), shipping time(s), product type(s), etc.). As part of the tracking mechanism, the numbers of clicks and the duration of pointer hovers on one or more sections of an e-commerce site are recorded, for a given time interval.

It is to be appreciated that this particular example code snippet shows just one example implementation of processing user digital behavior, and alternative implementations of the process can be used in other embodiments.

FIG. 5 shows an example code snippet for processing user digital behavior in an illustrative embodiment. In this embodiment, example code snippet 500 is executed by or under the control of at least one processing system and/or device. For example, the example code snippet 500 may be viewed as comprising a portion of a software implementation of at least part of the digital transaction management system 105 of the FIG. 1 embodiment.

The example code snippet 500 illustrates the updating and removal of the tracking of a user's online digital behavior (e.g., pointer hovers and clicks as seen in code snippet 500) on one or more sections of an e-commerce site (e.g., sections pertaining to product specifications, price(s), shipping time(s), product type(s), etc.). Also, as depicted in code snippet 500, a chatbot message event is evoked when the session ends, or when the user completes the transaction.

It is to be appreciated that this particular example code snippet shows just one example implementation of processing user digital behavior, and alternative implementations of the process can be used in other embodiments.

FIG. 6 shows an example code snippet for implementing at least a portion of an automated conversation exchange processing program function in an illustrative embodiment. In this embodiment, example code snippet 600 is executed by or under the control of at least one processing system and/or device. For example, the example code snippet 600 may be viewed as comprising a portion of a software implementation of at least part of user device 102 of the FIG. 1 embodiment and/or user device 202 (in connection with chatbot 203, for example) of the FIG. 2 embodiment.

The example code snippet 600 illustrates the functioning of the chatbot to display product recommendations and/or customized deals, which are generated based on at least one prediction from the artificial intelligence model and the reason(s) identified for cart abandonment, on the e-commerce site screen and/or interface. The example shown in code snippet 600 illustrates a scenario wherein shipping time, configuration, and price are identified as reasons for cart abandonment by the user, and based thereon, recommendations for various laptops are provided to the user through chatbot messages.

It is to be appreciated that this particular example code snippet shows just one example implementation of a portion of an automated conversation exchange processing program function, and alternative implementations of the process can be used in other embodiments.

FIG. 7 shows an example code snippet for training an artificial intelligence classification model in an illustrative embodiment. In this embodiment, example code snippet 700 is executed by or under the control of at least one processing system and/or device. For example, the example code snippet 700 may be viewed as comprising a portion of a software implementation of at least part of the digital transaction management system 105 of the FIG. 1 embodiment.

The example code snippet 700 illustrates the training of a supervised artificial intelligence classification model. In this example illustration, a logistic regression algorithm is used for building the classifier. Specifically, as shown in example code snippet 700, a scaler and a classifier are used as global variables used in connection with training and testing the model using a partitioned dataset. Additionally, as shown in example code snippet 700, the model is fit and scored for accuracy.

It is to be appreciated that this particular example code snippet shows just one example implementation of training an artificial intelligence classification model, and alternative implementations of the process can be used in other embodiments.

FIG. 8 shows an example code snippet for identifying one or more reasons for cart abandonment in an illustrative embodiment. In this embodiment, example code snippet 800 is executed by or under the control of at least one processing system and/or device. For example, the example code snippet 800 may be viewed as comprising a portion of a software implementation of at least part of the digital transaction management system 105 of the FIG. 1 embodiment.

The example code snippet 800 illustrates the identification of one or more reasons for cart abandonment by ranking a user's pointer hovers and clicks from one or more sections of an e-commerce site (e.g., sections pertaining to product specifications, price(s), shipping time(s), product type(s), etc.). Functions shown in example code snippet 800 include a Euclidean distance function as well as a mapping function used in connection with existing labels. Also, in one or more embodiments, the identification of the reasons(s) for cart abandonment function is independent from and/or not the result of the artificial intelligence model, but is based on ranking aspects of the user's digital behavior (e.g., pointer hovers and clicks) from different sections of the e-commerce site.

It is to be appreciated that this particular example code snippet shows just one example of identifying one or more reasons for cart abandonment, and alternative implementations of the process can be used in other embodiments.

FIG. 9 shows an example code snippet for implementing a trained artificial intelligence classification model in an illustrative embodiment. In this embodiment, example code snippet 900 is executed by or under the control of at least one processing system and/or device. For example, the example code snippet 900 may be viewed as comprising a portion of a software implementation of at least part of the digital transaction management system 105 of the FIG. 1 embodiment.

The example code snippet 900 illustrates the serving of predictions of the trained artificial intelligence model. Based on the prediction from the model and the reason(s) identified for cart abandonment, product recommendations and/or customized deals are generated and offered to the user. As illustrated in example code snippet 900, relevant data are obtained in addition to request parameters and classification results, and based thereon, a prediction response is returned in a particular format (e.g., JavaScript Object Notation (JSON) format).

It is to be appreciated that this particular example code snippet shows just one example implementation of a trained artificial intelligence classification model, and alternative implementations of the process can be used in other embodiments.

Figure 10:
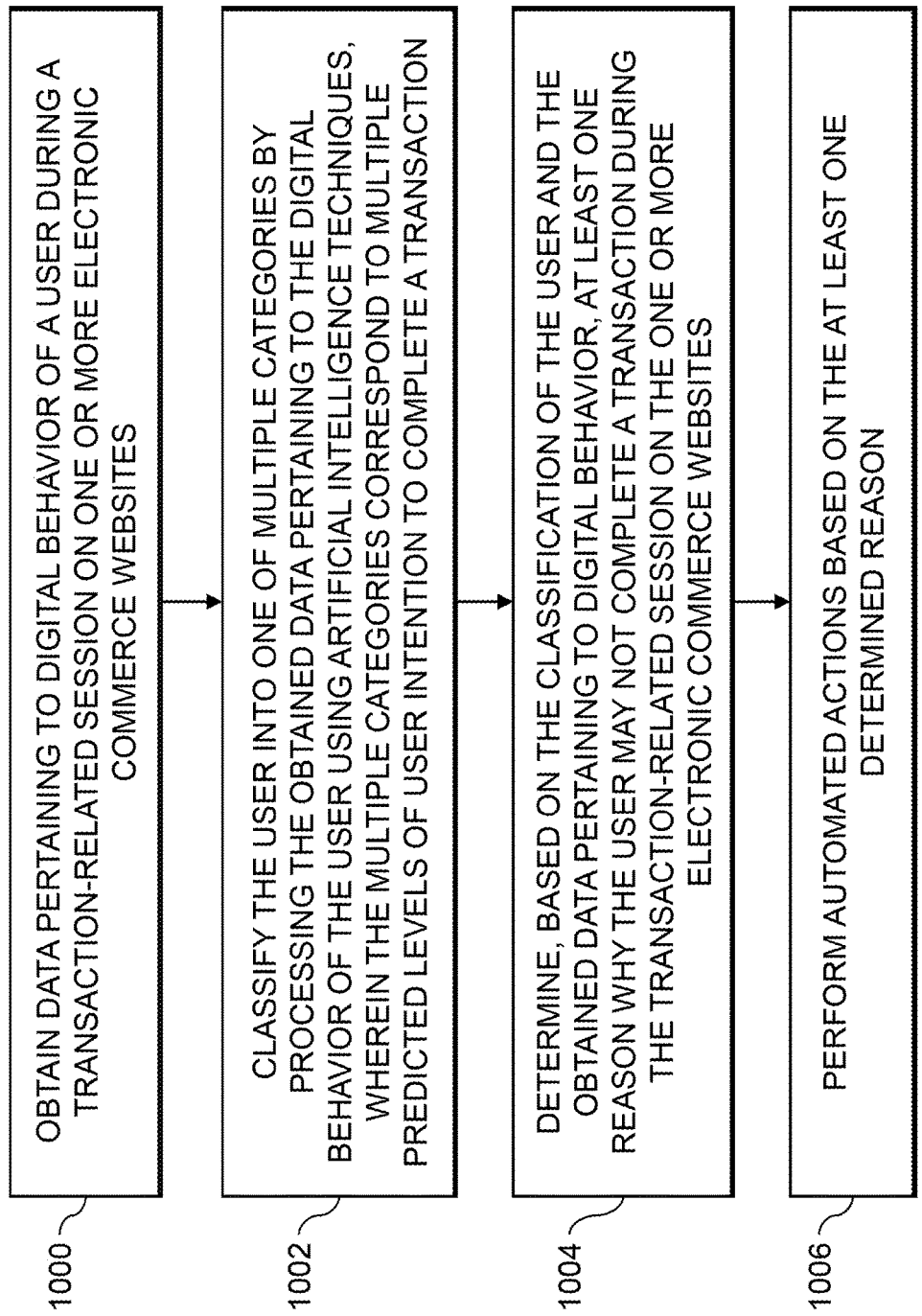
FIG. 10 is a flow diagram of a process for determining transaction-related user intentions using artificial intelligence techniques in an illustrative embodiment.

FIG. 10 is a flow diagram of a process for determining transaction-related user intentions using artificial intelligence techniques in an illustrative embodiment. It is to be understood that this particular process is only an example, and additional or alternative processes can be carried out in other embodiments.

In this embodiment, the process includes steps 1000 through 1006. These steps are assumed to be performed by the digital transaction management system 105 utilizing its modules 112, 114, and 116.

Step 1000 includes obtaining data pertaining to digital behavior of a user during a transaction-related session on one or more electronic commerce websites. The data pertaining to digital behavior of the user can include data pertaining to pointer hover activity on the one or more electronic commerce websites and/or data pertaining to click activity on the one or more electronic commerce websites.

Step 1002 includes classifying the user into one of multiple categories by processing at least a portion of the obtained data pertaining to the digital behavior of the user using one or more artificial intelligence techniques, wherein the multiple categories correspond to multiple predicted levels of user intention to complete a transaction. In at least one embodiment, the one or more artificial intelligence techniques include at least one supervised machine learning model. Such an embodiment also includes generating the at least one supervised machine learning model using a logistic regression algorithm.

Step 1004 includes determining, based at least in part on the classification of the user and the obtained data pertaining to the digital behavior of the user, at least one reason why the user may not complete a transaction during the transaction-related session on the one or more electronic commerce websites. In at least one embodiment, determining the at least one reason includes ranking at least a portion of the obtained data pertaining to the digital behavior of the user in relation to one or more subject matter-related sections of the one or more electronic commerce websites.

Step 1006 includes performing one or more automated actions based at least in part on the at least one determined reason. Performing the one or more automated actions can include generating and outputting to the user, during the transaction-related session, one or more product recommendations related to the one or more electronic commerce websites. In at least one embodiment, outputting the one or more product recommendations to the user includes outputting, during the transaction-related session, the one or more product recommendations to an automated conversation exchange processing program integrated with at least a portion of the one or more electronic commerce websites.

Also, performing the one or more automated actions can include generating and outputting to the user, during the transaction-related session, one or more transaction-related offers customized for the user. In one or more embodiments, outputting to the user the one or more transaction-related offers customized for the user includes outputting, during the transaction-related session, the one or more transaction-related offers to an automated conversation exchange processing program integrated with at least a portion of the one or more electronic commerce websites. Additionally, performing the one or more automated actions can be further based at least in part on one or more user preferences determined from the user's purchase history.

Accordingly, the particular processing operations and other functionality described in conjunction with the flow diagram of FIG. 10 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to dynamically generate and output customized recommendations and/or offers for a given user during the user's transaction session using artificial intelligence techniques in conjunction with user digital behavior associated with an incomplete transaction. These and other embodiments can effectively overcome problems associated with ineffective data collection and implementation prevalent in conventional transaction management approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
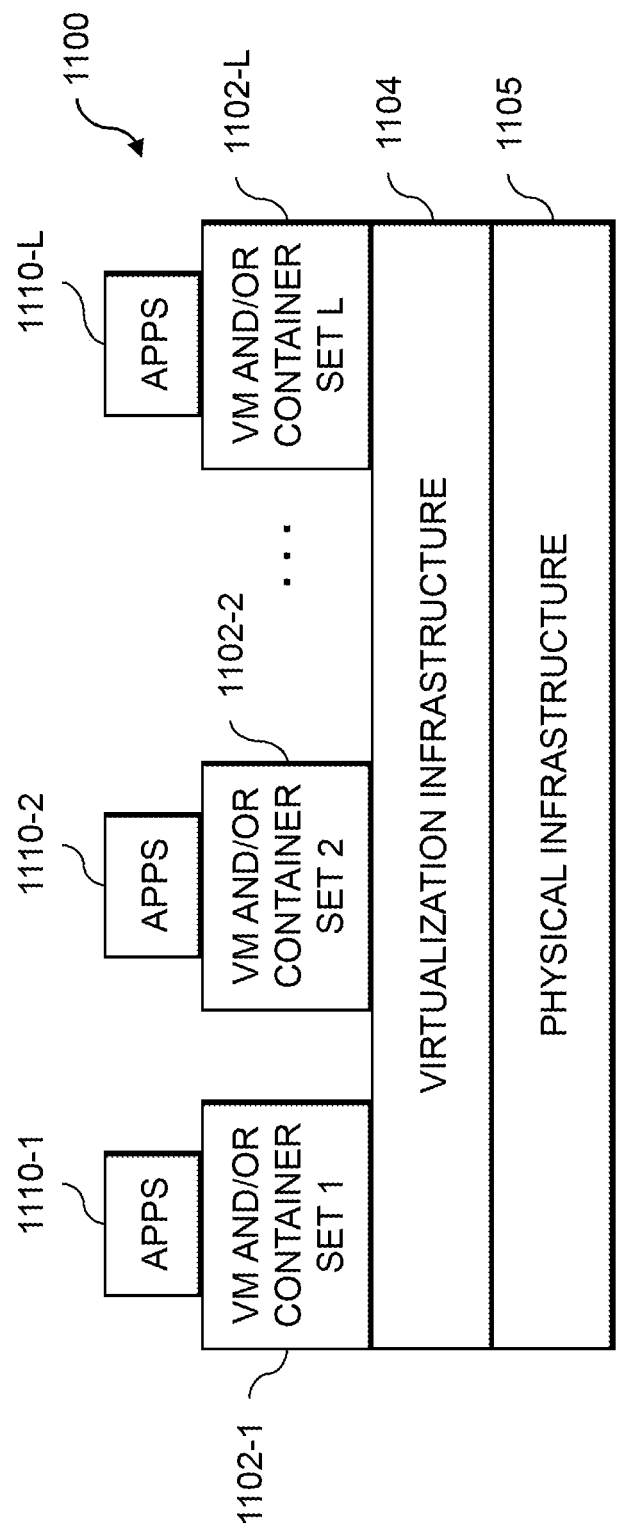
FIGS. 11 and 12 show examples of processing platforms that may be utilized to implement at least a portion of an information processing system in illustrative embodiments.
Figure 12:
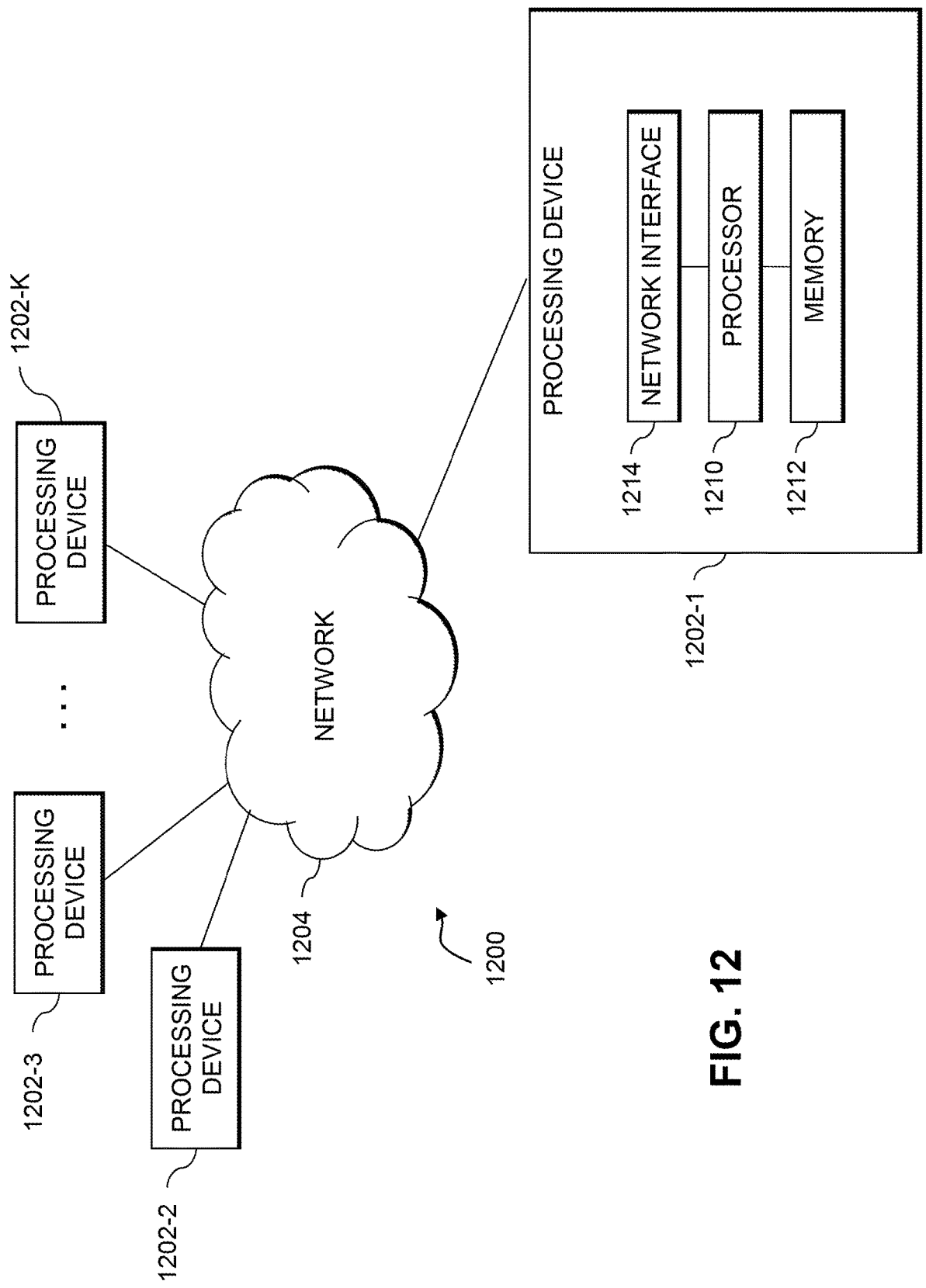

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, wherein the hypervisor platform has an associated virtual infrastructure management system. The underlying physical machines comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1202-1 in the processing platform 1200 comprises a processor 1210 coupled to a memory 1212.

The processor 1210 comprises a microprocessor, a microcontroller, an application-specific integrated circuit (ASIC), a field-programmable gate array (FPGA) or other type of processing circuitry, as well as portions or combinations of such circuitry elements.

The memory 1212 comprises random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining data pertaining to digital behavior of a user during a transaction-related session on one or more electronic commerce websites;
classifying the user into one of multiple categories by processing at least a portion of the obtained data pertaining to the digital behavior of the user using a supervised artificial intelligence classification model, wherein the multiple categories correspond to multiple predicted levels of user intention to complete a transaction;
determining, based at least in part on the classification of the user and the obtained data pertaining to the digital behavior of the user, at least one reason why the user may not complete a transaction during the transaction-related session on the one or more electronic commerce websites, wherein determining the at least one reason comprises ranking at least a portion of the obtained data pertaining to the digital behavior of the user in relation to one or more subject matter-related sections of the one or more electronic commerce websites, wherein the ranking is based at least in part on processing the at least a portion of the obtained data pertaining to the digital behavior of the user using at least one distance function; and
performing one or more automated actions based at least in part on the at least one determined reason, wherein performing one or more automated actions comprises:
automatically training the supervised artificial intelligence classification model using at least a portion of the at least one determined reason and at least one logistic regression algorithm in connection with at least one scaler and at least one classifier implemented as variables; and
generating and outputting to the user, during the transaction-related session and using at least one chatbot comprising at least one automated conversation exchange processing program integrated with at least a portion of the one or more electronic commerce websites, one or more product recommendations related to the one or more electronic commerce websites, wherein generating and outputting the one or more product recommendations to the user comprises generating and outputting, in approximately real-time during the transaction-related session, the one or more product recommendations using the at least one chatbot integrated with at least a portion of the one or more electronic commerce websites;
wherein the method is performed by at least one processing device comprising a processor coupled to a memory.

2. The computer-implemented method of claim 1, wherein performing the one or more automated actions comprises generating and outputting to the user, during the transaction-related session, one or more transaction-related offers customized for the user.

3. The computer-implemented method of claim 2, wherein outputting to the user the one or more transaction-related offers customized for the user comprises outputting, during the transaction-related session, the one or more transaction-related offers to the at least one chatbot integrated with at least a portion of the one or more electronic commerce web sites.

4. The computer-implemented method of claim 1, wherein performing the one or more automated actions is further based at least in part on one or more user preferences determined from the user's purchase history.

5. The computer-implemented method of claim 1, wherein the data pertaining to digital behavior of the user comprise data pertaining to pointer hover activity on the one or more electronic commerce websites.

6. The computer-implemented method of claim 1, wherein the data pertaining to digital behavior of the user comprise data pertaining to click activity on the one or more electronic commerce websites.

7. The computer-implemented method of claim 1, wherein generating and outputting the one or more product recommendations using the at least one chatbot integrated with at least a portion of the one or more electronic commerce websites comprises outputting the one or more product recommendations at least one of visually as text data and visually as image data via at least one interface associated with the one or more electronic commerce websites.

8. A non-transitory processor-readable storage medium having stored therein program code of one or more software programs, wherein the program code when executed by at least one processing device causes the at least one processing device:
- to obtain data pertaining to digital behavior of a user during a transaction-related session on one or more electronic commerce websites;
- to classify the user into one of multiple categories by processing at least a portion of the obtained data pertaining to the digital behavior of the user using a supervised artificial intelligence classification model, wherein the multiple categories correspond to multiple predicted levels of user intention to complete a transaction;
- to determine, based at least in part on the classification of the user and the obtained data pertaining to the digital behavior of the user, at least one reason why the user may not complete a transaction during the transaction-related session on the one or more electronic commerce websites, wherein determining the at least one reason comprises ranking at least a portion of the obtained data pertaining to the digital behavior of the user in relation to one or more subject matter-related sections of the one or more electronic commerce websites, wherein the ranking is based at least in part on processing the at least a portion of the obtained data pertaining to the digital behavior of the user using at least one distance function; and
- to perform one or more automated actions based at least in part on the at least one determined reason, wherein performing one or more automated actions comprises:
  - automatically training the supervised artificial intelligence classification model using at least a portion of the at least one determined reason and at least one logistic regression algorithm in connection with at least one scaler and at least one classifier implemented as variables; and
  - generating and outputting to the user, during the transaction-related session and using at least one chatbot comprising at least one automated conversation exchange processing program integrated with at least a portion of the one or more electronic commerce websites, one or more product recommendations related to the one or more electronic commerce websites, wherein generating and outputting the one or more product recommendations to the user comprises generating and outputting, in approximately real-time during the transaction-related session, the one or more product recommendations using the at least one chatbot integrated with at least a portion of the one or more electronic commerce websites.

9. The non-transitory processor-readable storage medium of claim 8, wherein performing the one or more automated actions comprises generating and outputting to the user, during the transaction-related session, one or more transaction-related offers customized for the user.

10. The non-transitory processor-readable storage medium of claim 9, wherein outputting to the user the one or more transaction-related offers customized for the user comprises outputting, during the transaction-related session, the one or more transaction-related offers to the at least one chatbot integrated with at least a portion of the one or more electronic commerce web sites.

11. The non-transitory processor-readable storage medium of claim 8, wherein the data pertaining to digital behavior of the user comprise data pertaining to pointer hover activity on the one or more electronic commerce websites.

12. The non-transitory processor-readable storage medium of claim 8, wherein performing the one or more automated actions is further based at least in part on one or more user preferences determined from the user's purchase history.

13. The non-transitory processor-readable storage medium of claim 8, wherein generating and outputting the one or more product recommendations using the at least one chatbot integrated with at least a portion of the one or more electronic commerce websites comprises outputting the one or more product recommendations at least one of visually as text data and visually as image data via at least one interface associated with the one or more electronic commerce websites.

14. An apparatus comprising:
- at least one processing device comprising a processor coupled to a memory;
- the at least one processing device being configured:
  - to obtain data pertaining to digital behavior of a user during a transaction-related session on one or more electronic commerce websites;
  - to classify the user into one of multiple categories by processing at least a portion of the obtained data pertaining to the digital behavior of the user using a supervised artificial intelligence classification model, wherein the multiple categories correspond to multiple predicted levels of user intention to complete a transaction;
  - to determine, based at least in part on the classification of the user and the obtained data pertaining to the digital behavior of the user, at least one reason why the user may not complete a transaction during the transaction-related session on the one or more electronic commerce websites, wherein determining the at least one reason comprises ranking at least a portion of the obtained data pertaining to the digital behavior of the user in relation to one or more subject matter-related sections of the one or more electronic commerce websites, wherein the ranking is based at least in part on processing the at least a portion of the obtained data pertaining to the digital behavior of the user using at least one distance function; and
  - to perform one or more automated actions based at least in part on the at least one determined reason, wherein performing one or more automated actions comprises:
    - automatically training the supervised artificial intelligence classification model using at least a portion of the at least one determined reason and at least one logistic regression algorithm in connection with at least one scaler and at least one classifier implemented as variables; and generating and outputting to the user, during the transaction-related session and using at least one chatbot comprising at least one automated conversation exchange processing program integrated with at least a portion of the one or more electronic commerce websites, one or more product recommendations related to the one or more electronic commerce websites, wherein generating and outputting the one or more product recommendations to the user comprises generating and outputting, in approximately real-time during the transaction-related session, the one or more product recommendations using the at least one chatbot integrated with at least a portion of the one or more electronic commerce web sites.

15. The apparatus of claim 14, wherein performing the one or more automated actions comprises generating and outputting to the user, during the transaction-related session, one or more transaction-related offers customized for the user.

16. The apparatus of claim 15, wherein outputting to the user the one or more transaction-related offers customized for the user comprises outputting, during the transaction-related session, the one or more transaction-related offers to the at least one chatbot integrated with at least a portion of the one or more electronic commerce websites.

17. The apparatus of claim 14, wherein the data pertaining to digital behavior of the user comprise data pertaining to pointer hover activity on the one or more electronic commerce websites.

18. The apparatus of claim 14, wherein the data pertaining to digital behavior of the user comprise data pertaining to click activity on the one or more electronic commerce websites.

19. The apparatus of claim 14, wherein performing the one or more automated actions is further based at least in part on one or more user preferences determined from the user's purchase history.

20. The apparatus of claim 14, wherein generating and outputting the one or more product recommendations using the at least one chatbot integrated with at least a portion of the one or more electronic commerce websites comprises outputting the one or more product recommendations at least one of visually as text data and visually as image data via at least one interface associated with the one or more electronic commerce websites.

* * * * *